US012567818B2

(12) United States Patent (10) Patent No.: US 12,567,818 B2
Sasso et al. (45) Date of Patent: Mar. 3, 2026

(54) DEVICE FOR RAPIDLY RELEASING AN ELECTROMECHANICAL PARKING BRAKE

(71) Applicants: HITACHI ASTEMO FRANCE, Drancy (FR); HITACHI ASTEMO HEILBRONN GMBH, Heilbronn (DE)

(72) Inventors: Julien Sasso, Champs sur Marne (FR); Maxime Demandre, Stuttgart (DE); Weiqiao Wang, Paris (FR); Alex Patrao Carqueijo, Pantin (FR)

(73) Assignees: HITACHI ASTEMO FRANCE, Drancy (FR); HITACHI ASTEMO HEILBRONN GMBH, Heilbronn (DE)

( * ) Notice: Subject to any disclaimer, the term of this patent is extended or adjusted under 35 U.S.C. 154(b) by 160 days.

(21) Appl. No.: 18/577,128

(22) PCT Filed: Jun. 30, 2022

(86) PCT No.: PCT/FR2022/051311
§ 371 (c)(1),
(2) Date: Jan. 5, 2024

(87) PCT Pub. No.: WO2023/281187
PCT Pub. Date: Jan. 12, 2023

(65) Prior Publication Data
US 2024/0380341 A1 Nov. 14, 2024

(30) Foreign Application Priority Data
Jul. 8, 2021 (FR) ..................................... 2107424

(51) Int. Cl.
*H02P 3/04* (2006.01)
*B60T 8/171* (2006.01)
(Continued)

(52) U.S. Cl.
CPC ................ *H02P 3/04* (2013.01); *B60T 8/171* (2013.01); *B60T 8/172* (2013.01); *B60T 13/746* (2013.01);
(Continued)

(58) Field of Classification Search
CPC . H02P 3/04; B60T 8/171; B60T 8/172; B60T 13/746; B60T 8/00; B60T 13/741;
(Continued)

(56) References Cited

U.S. PATENT DOCUMENTS 7,992,691 B2 * 8/2011 Maron .................. B60T 17/221
188/158
8,397,879 B2 3/2013 Maron et al.
(Continued)

FOREIGN PATENT DOCUMENTS

JP 2016124403 A 7/2016
WO 2009053429 A1 4/2009

OTHER PUBLICATIONS

Search Report and Written Opinion for International Application No. PCT/FR2022/051311 mailed Oct. 21, 2022.

*Primary Examiner* — David Luo
(74) *Attorney, Agent, or Firm* — McDonald Hopkins LLC

(57) ABSTRACT

The releases of an electromechanical parking brake are controlled by measuring the change in the intensity (I) of the electrical current provided to the control motor, or a function derived from this intensity, and by extending the release of the brake only for a determined duration (Δt) after stabilization of this intensity, in order not to unnecessarily increase the idle travel of the brake actuator nor to extend the duration of the control. The determined duration (Δt) also depends on the temperature and on the hydraulic pressure in the brake.

10 Claims, 5 Drawing Sheets

(51) Int. Cl.

| | |
|---|---|
| *B60T 8/172* | (2006.01) |
| *B60T 13/74* | (2006.01) |
| *F16D 65/18* | (2006.01) |
| *F16D 66/00* | (2006.01) |
| *F16D 121/02* | (2012.01) |
| *F16D 121/24* | (2012.01) |
| *F16D 125/40* | (2012.01) |

(52) U.S. Cl.

CPC ............. *F16D 65/18* (2013.01); *F16D 66/00* (2013.01); *F16D 2066/001* (2013.01); *F16D 2066/005* (2013.01); *F16D 2121/02* (2013.01); *F16D 2121/24* (2013.01); *F16D 2125/40* (2013.01)

(58) Field of Classification Search

CPC .......... B60T 13/74; F16D 65/18; F16D 66/00; F16D 2066/001; F16D 2066/005; F16D 2121/02; F16D 2121/24; F16D 2125/40; F16D 65/183; F16D 55/226

USPC .................................................. 318/372, 362

See application file for complete search history.

(56) References Cited

U.S. PATENT DOCUMENTS

| | | | |
|---|---|---|---|
| 9,694,799 B2 * | 7/2017 | Baehrle-Miller | ..... B60T 13/746 |
| 2016/0032399 A1 | 2/2016 | Gomis et al. | |
| 2016/0032995 A1 | 2/2016 | Nishino et al. | |

\* cited by examiner

DEVICE FOR RAPIDLY RELEASING AN ELECTROMECHANICAL PARKING BRAKE

CROSS-REFERENCE TO RELATED APPLICATIONS

This is a National Stage application of PCT international application PCT/FR2022/051311, filed on Jun. 30, 2022, which claims priority from French Patent Application No. 21 07424, filed on Jul. 8, 2021, both which are incorporated herein by reference in their entirety.

The invention relates to a device for rapidly releasing an electromechanical parking brake of a vehicle.

Many vehicles are equipped with parking brakes the control of which is not manual, and in particular electromechanical brakes. Such brakes are provided with a mechanical actuator driven by an electric motor. The driver of the vehicle typically controls them by pressing on a button that switches them between clamping states and release states. When a command to change state is made by the driver, a motor control unit sensitive to this command acts on the actuator of the brake according to a predefined strategy. And when the brake has no sensor that would make it possible to measure a clamping force or pressure, a usual strategy for demanding release of the brake consists in delivering to the electric motor an electrical command the duration of which is sufficient to guarantee that the brake is completely released at the end of the command, whatever the initial state of the brake and the circumstances of the release.

However, this duration of command is excessive in the majority of situations, and is felt to be long by the driver.

The object of the invention is thus to reduce this duration of release when possible to improve the ease of use of the vehicle, still relying on an actuator command strategy (release strategy) based on an issue of an electrical command, while guaranteeing complete release of the brake.

The invention applies mainly, but not exclusively, to braking systems the service braking of which is provided hydraulically whereas the parking and emergency braking is provided by the electric motor.

The document US 2016/032399 A1 relates to an electromechanical parking brake device for a vehicle, comprising a brake associated with a wheel of the vehicle, an actuator of the brake, an electric motor for moving the actuator, and a motor control unit of the electric motor that comprises:

a module for supplying commands to the electric motor, including commands to release the brake;

and where the motor control unit also comprises:

a module for continuously measuring the intensity of the electric current supplied to the electric motor during the release commands;

a decision module connected to the modules for continuously measuring the intensity of the electric current and for supplying commands, which, during each of the release commands, operates by evaluating successive values of said intensity of the electric current, by noting a stabilisation of said intensity of the electric current, and by stopping supplying the electric current after having noted the stabilisation.

In this document, an additional opening travel of the pads is applied after the stabilisation of the current is detected, in order to guarantee effective release of the brake under all circumstances. It appears however that this opening cannot in general be obtained with exactitude, and that it risks being less than the value judged necessary. The inventors have in fact found that the stabilisation of the electric current, supposed to coincide with the start of release of the pads, often occurs previously according to the state of the brake, and in particular according to the temperature thereof and the possible application of hydraulic braking implemented by the driver.

The invention stands apart from the above document in that the control unit comprises a temperature sensor and a hydraulic-pressure sensor continuously making measurements, respectively, of a temperature and of a hydraulic pressure representing a temperature and a hydraulic pressure present in the brake, the decision module is connected to the temperature sensor and to the hydraulic-pressure sensor, and the decision module is arranged to determine a given duration of prolongation of supply of the electric current after the stabilisation has been noted, the given duration being dependent on the measurements of the temperature sensor and of the hydraulic-pressure sensor.

The duration of prolongation of the release is then determined with a precision making it possible to guarantee sufficient, but not at all excessive, release of the brake. The more rudimentary method of the prior document does not make it possible to obtain this result, as it does not take into account the state of the brake at the moment of release.

The precision of estimation of the duration of prolongation, necessary for sure release, is further increased if the given duration also depends on a degree of stabilisation of the intensity of the electric current, obtained during stabilisation.

In practice, the duration of prolongation can be determined for applying an end-of-release travel ($\Delta$) plus a safety release travel ($I_2+I_3$) to the brake, the end-of-release travel ($\Delta I$) generally being obtained by a linear function of the hydraulic pressure, the safety release travel ($I_2+I_3$) being fixed.

Another aspect of the invention is an electromechanical parking brake device for a vehicle, comprising said brake which is associated with a wheel of the vehicle, an actuator of the brake, said electric motor for moving the actuator, and the motor control unit of the electric motor in accordance with the above.

Another aspect of the invention is a motor vehicle provided with the parking brake device in accordance with the above.

Another aspect of the invention is a method for controlling an electromechanical vehicle brake by electric-current commands for clamping and releasing the brake supplied to an electric motor controlling an actuator of the brake, comprising continuous measurements of intensity values of the electric current during the release commands, of a temperature representing a temperature in the brake and of a hydraulic pressure representing a hydraulic pressure in the brake, and an interruption of the release commands after a given duration as soon as a stabilisation of said values is noted, the given duration being dependent on the measurements of the temperature, of the hydraulic pressure and of an electric-current stabilisation value.

According to certain optional but advantageous features of the invention:

the motor control unit is designed to calculate a temporal drift of said intensity of the electric current;

the motor control unit is designed to note the stabilisation by detecting that a given threshold has been crossed, by a function obtained by means of the measuring module;

the function is an absolute value of said temporal drift;

the function is the intensity of the electric current.

The invention will now be described in its various aspects, features and advantages by means of the detailed description of the following figures, which illustrate a particular embodiment thereof given purely by way of illustration:

Figure 8:
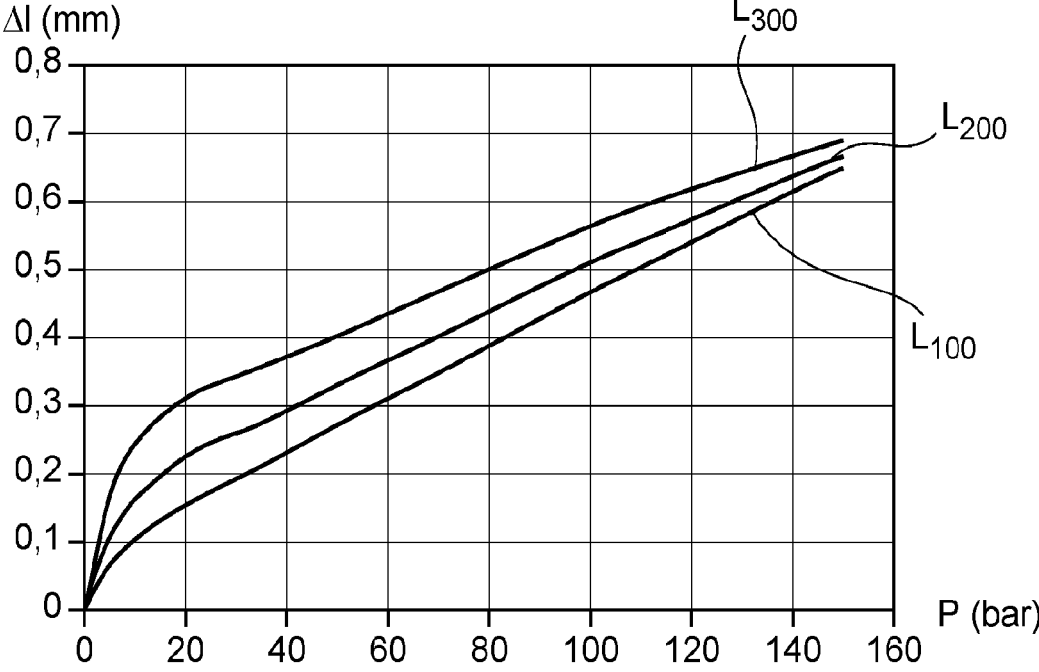

and FIG. 8 illustrates functions of correcting the strategy according to the state of the brake.

Figure 1:
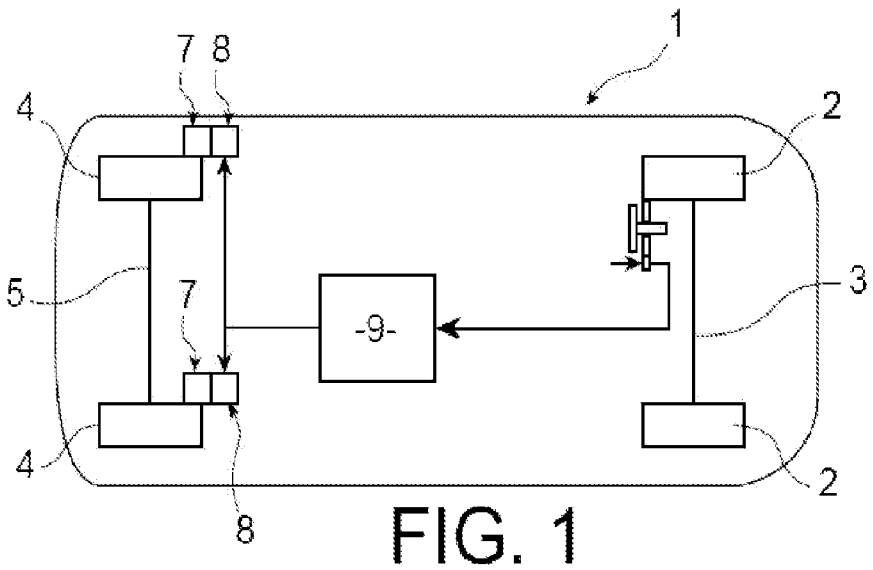
FIG. 1 shows schematically a motor vehicle.

FIG. 1 shows an automobile 1 equipped with two driving and steering front wheels 2 on a front axle 3, and two non-driving and non-steering rear wheels 4 on a rear axle 5. Each of the front wheels 2 is equipped with a main service brake directly actuated by the driver, and each of the rear wheels 4 is equipped with a brake 7 described below in detail, and which is associated with an actuator 8 able to make it work as a parking and emergency brake. The actuators 8 of the two brakes 7 are controlled by one and the same motor control unit 9 according to various items information relating to certain parameters of the vehicle 1 and to its driving state. The motor control unit 9 is active when emergency braking becomes necessary or when parking is required.

Figure 2:
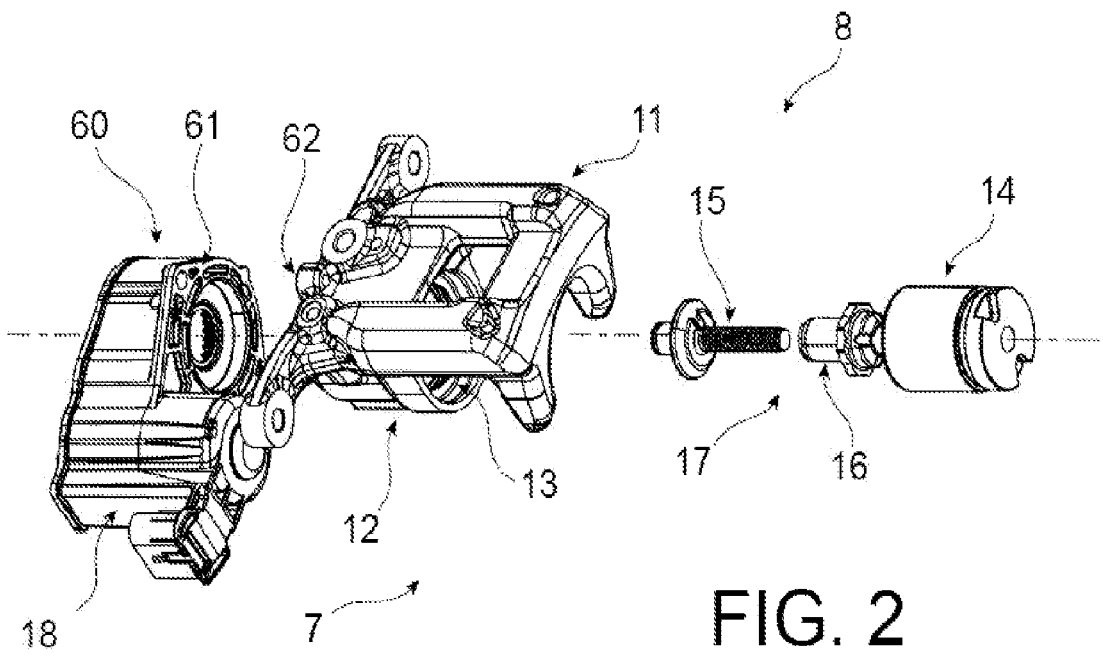
FIG. 2 illustrates an electromechanical brake in exploded view.

FIG. 2 illustrates schematically a known non-limitative embodiment of the brake 7, in a representation in exploded view. The brake 7 comprises a calliper 11 joined to a cylindrically shaped housing 12. It also comprises a geared motor 60 a flange 61 of which is joined to a flange 62 at the rear face of the housing 12 by screws (not shown here). This geared motor 60 contains an electric motor 18 and gears reducing the speed of rotation of said electric motor 18. The housing 12 comprises a hydraulic cavity 13 referred to as a cylinder, open towards the front (to the right in FIG. 2) and wherein a piston 14 carrying a movable pad (not shown) slides. Brakings are implemented by sliding the piston 14 forwards, to move the movable pad towards a fixed pad located at the front end of the calliper 11 and to grip a disc of the rear wheel 4 between these pads. This movement of the piston 14 is obtained, when the brake 7 is working as a service brake, by applying a hydraulic pressure in the hydraulic cavity 13 while the vehicle is being driven: this pressure is exerted on the rear face of the piston 41 and pushes it forward. If, however, the brake 7 is controlled as a parking brake or as an emergency brake, the braking is implemented by using the electric motor 18 according to strategies imposed by the motor control unit 9. The electric motor 18 moves the gears of the geared motor 60, which turns a screw 15 that extends in the hydraulic cavity 13. The screw 15 is in engagement with a nut 16 on which a rear face of the piston 14 is then in abutment. The rotations of the screw 15 are converted into translations of the nut 16 and of the piston 14, which moves according to the duration of actuation of the electric motor 18. The actuator 8 considered here comprises in particular the geared motor 60 and therefore its electric motor 18, and the system 17 composed of the screw 15 and of the nut 16.

The invention could be used on vehicles and brakes other than these.

Figure 3:
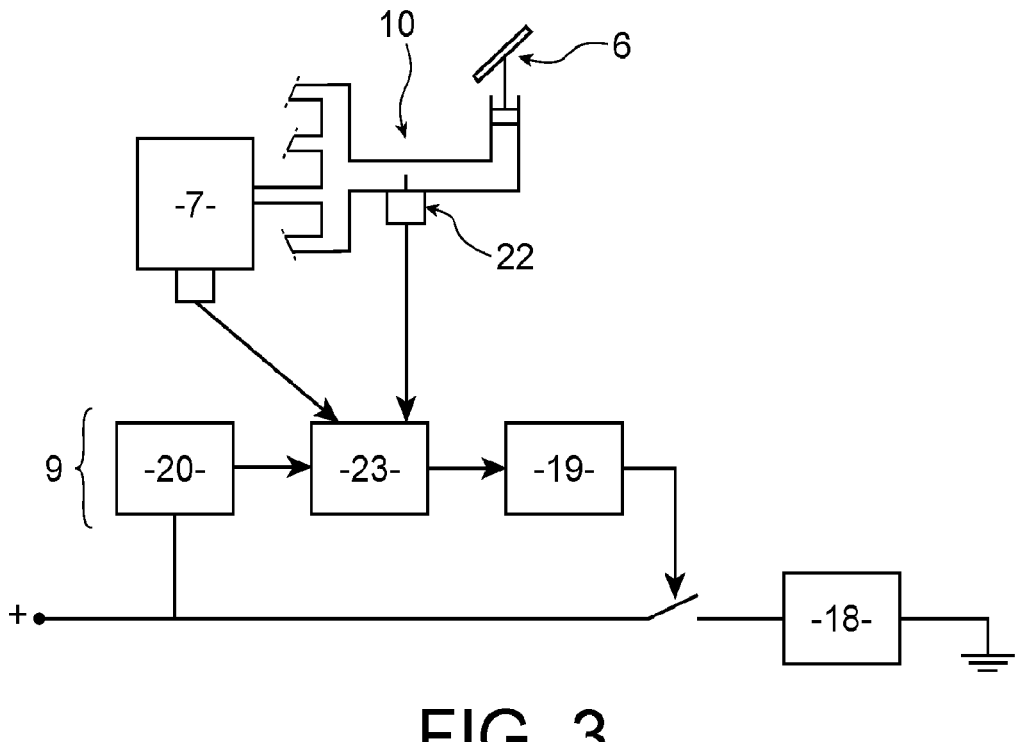
FIG. 3 illustrates the motor control unit of said brake.

FIG. 3 illustrates the motor control unit 9 in more detail. It comprises: a command-supply module 19 that supplies commands to the electric motor 18 while being connected to a battery or other source of energy present in the vehicle 1; a measuring module 20; and a decision model 23 that connects the command-supply module 19 and measuring module 20, and which uses the output signal of the measuring module 20 to adjust the duration of the commands. The measuring module 20 and the decision model 23 are features of the invention. The measuring model 20 measures the intensity of the current in the electrical circuit on which the electric motor 18 and said energy source are installed. The device also comprises means for continuously measuring a temperature of the brake 7 by a temperature sensor 21, and a hydraulic pressure 22. The temperature sensor 21 is advantageously placed as close as possible to one of the brake pads 7 in order to best attenuate the temperature thereof, and the hydraulic-pressure sensor 22 can directly measure the pressure in the hydraulic cavity 13 or, as shown here, estimate the hydraulic pressure in the brake 7 by measuring the pressure in another portion of the hydraulic circuit 10 subjected to the action on a brake pedal 6, such as the master cylinder. The temperature and hydraulic-pressure sensors 21 and 22, like the measuring module 20, supply their measurements to the decision model 23.

Figure 4:
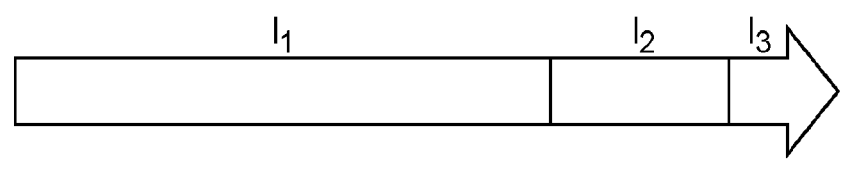
FIG. 4 illustrates the steps of releasing the brake.

FIG. 4 is a diagram that illustrates the steps of the release of the brake 7 from a clamped state according to the translation movement of the nut 16 of the screw-nut system 17, in accordance with the known strategy. This movement can be broken down into three deflections: a first deflection, of length $I_1$, corresponds to the useful travel of the screw-nut system 17 and is supposed to result in the start of the release of the portions; a second deflection, of length $I_2$, must be added although it is theoretically unnecessary to the release of the brake, but corresponds to an idle stroke of the screw-nut system 17 that serves to leave clear the disc gripped between the pads of the brake 7; and a third deflection $I_3$ must also be added to guarantee that the idle stroke required is actually obtained despite the uncertainties of construction and operation of the brake 7. According to an actual example, the deflections have the values $I_1$=0.94 mm, $I_2$=0.35 mm and $I_3$=0.05 mm respectively, the total deflection then being equal to 1.34 mm. All these deflections are invariable in a known strategy. It can be seen that the deflections $I_2$ et $I_3$ imposed for reasons of safety or correct subsequent operation of the brake 7 have an important part in the total deflection; it must be added that the deflection necessary for the release of the pads of the brake 7 is in reality almost always less than $I_1$, and that it is often very much less, since $I_1$ is a value calculated from an extreme clamping of the brake 7 that is not necessarily present at the start of the release. The commands of the known methods have however, in the main, a uniform duration calculated to impose this total deflection ($I_1$+$I_2$+$I_3$).

Figure 5:
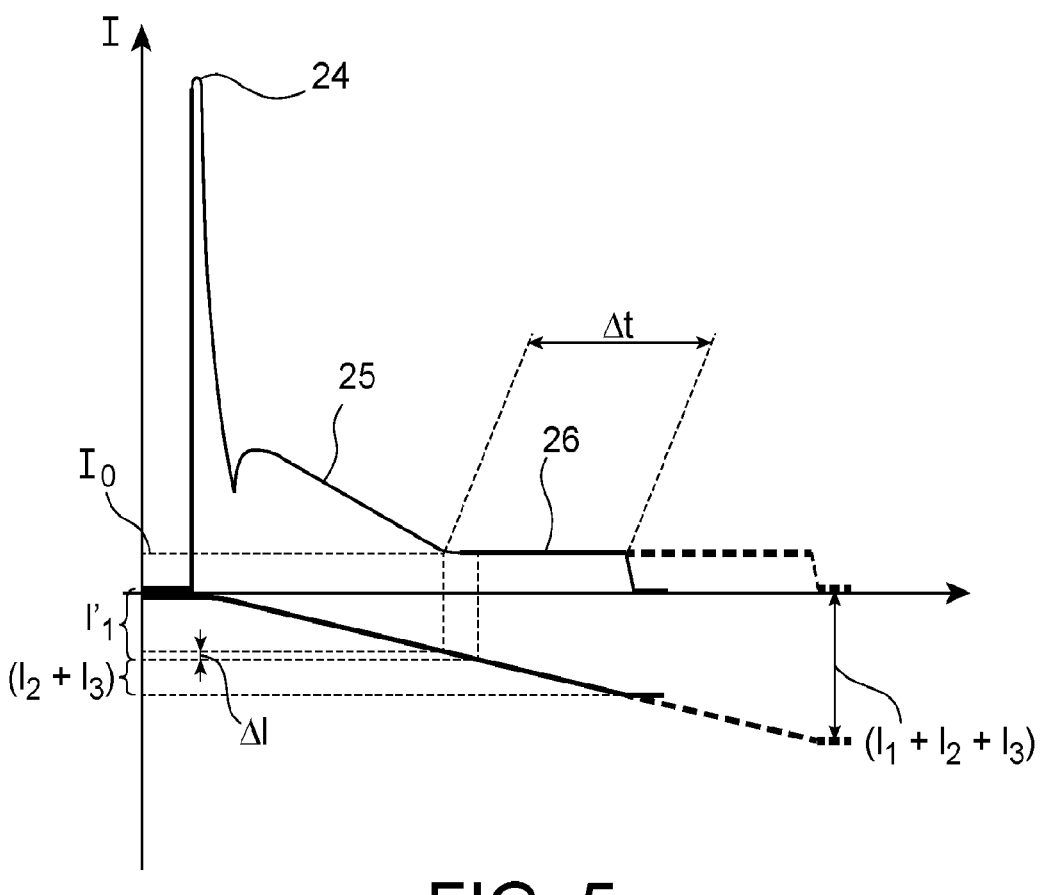
FIG. 5 illustrates a command for the electric current controlling the brake.

The experimental form of an electrical command for the release of the brake 7 from a clamped state is shown at the top part of FIG. 5, which shows the intensity I of the current passing through the electrical circuit comprising the electric motor 18 as a function of time t; the bottom part of this FIG. 5 shows the corresponding deflection obtained for the actuator 8. The command comprises successively a start peak 24, a decreasing portion 25 and a flat portion 26 where the current is uniform at a low intensity (idle current). The start peak 24 at high intensity of the current corresponds to a transient state mainly due to the taking up of clearance in the mechanisms, the decreasing portion 25 corresponds to the progressive release of the brake 7, and the flat portion 26 to a travel with residual force, or idle stroke of the actuator 8 when the brake 7 is completely released. In the decreasing portion 25 and the flat portion 26, the intensity I is proportional to the force applied by the electric motor 18 and which is necessary for moving the actuator 8.

Figure 6:
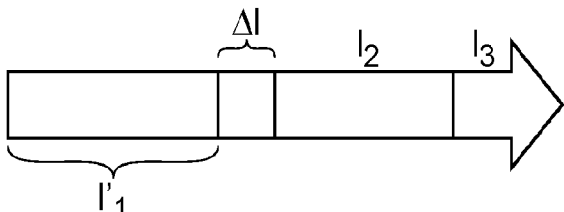
FIG. 6 illustrates how the duration of release of the brake is adjusted.

According to the invention, the total deflection of the actuator of the brake 7 (or the translation of the nut 16) during the release must become equal to $(I_1'+I_2+I_3)$ (FIG. 6), where $I_1'$ corresponds to the deflection strictly necessary for the release of the pads, and therefore $I_1' \leq I_1$, whereas $I_2$ and $I_3$ remain unchanged. It must be emphasised that $I'_1$ may be much less than $I_1$, for example around 0.6 mm in the example mentioned.

This is achieved by adding the measuring module 20, which measures the intensity I of the current supplied to the electric motor 18 and the output signal of which, supplied to the decision model 23, is a function in accordance with FIG. 5. When the flat portion 26 is reached, the decision model 23 calculates a duration of prolongation $\Delta t$ of application of the current making it possible to accomplish only the total travel necessary $(I'_1+I_2+I_3)$. Detecting the flat portion 26 amounts to detecting stabilisation of the electric current. The detection criterion can advantageously be the crossing towards zero of a threshold determined by the absolute value of the temporal drift of the intensity I of the current (dI/dt); other stabilisation criteria could be envisaged, such as the crossing towards zero of a threshold of the value of the intensity I of the electric current.

FIG. 5 also illustrates, in broken lines, the effects of the known strategy: the electrical command is prolonged after $\Delta t$, as is the idle stroke, so as finally to obtain the deflection $(I_1+I_2+I_3)$.

The method for determining the duration of prolongation $\Delta t$ is an essential aspect of the invention, and will be detailed below: the stabilisation of the electrical current at a stabilisation value $I_0$ does not generally in reality coincide with the commencement of the release of the pads.

Figure 7:
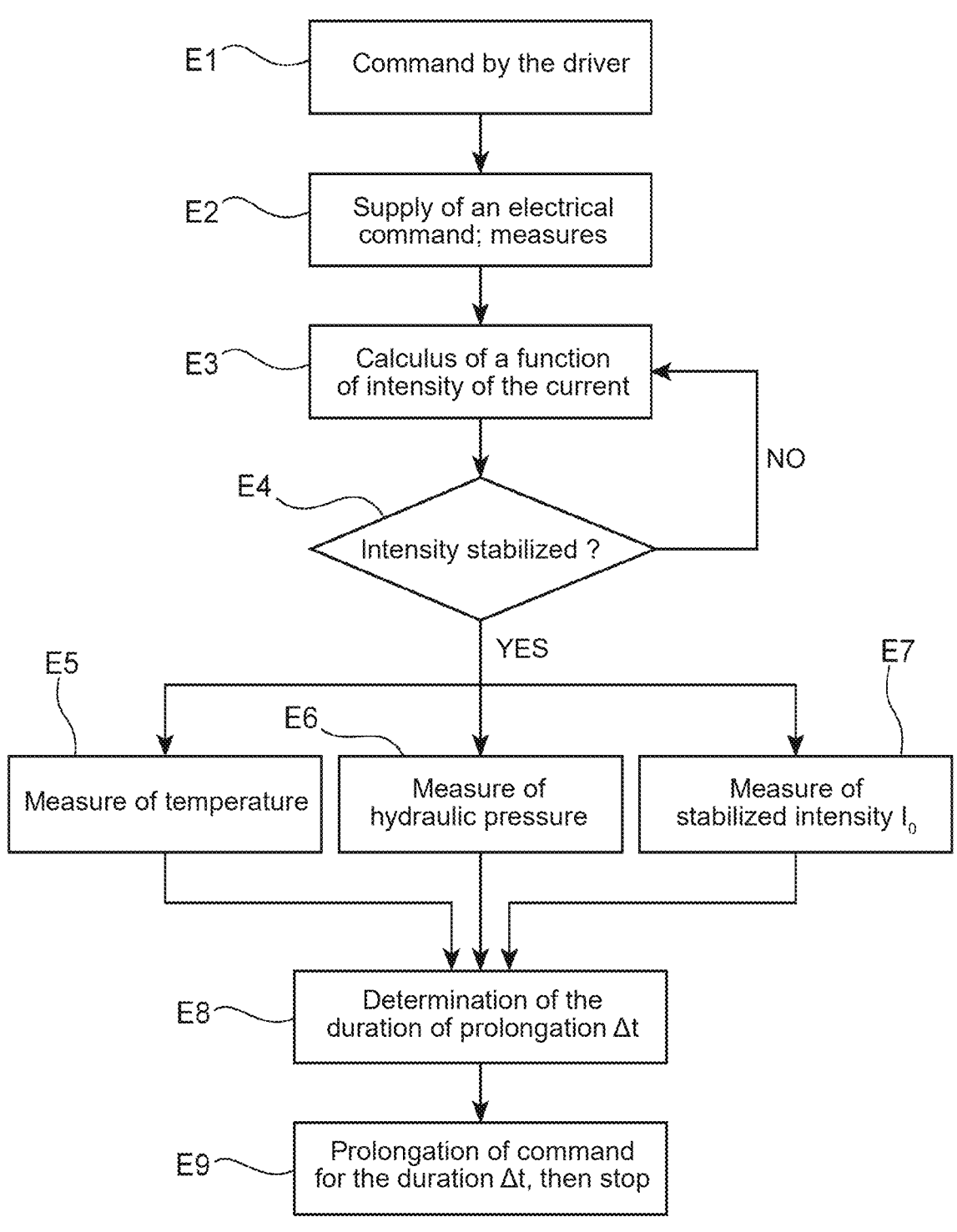
FIG. 7 is a diagram of the method.

FIG. 7 illustrates the main steps of the method. Step E1 consists in applying a command to release the brake by the driver. At step E2 the motor control unit 9 becomes active, the command-supply module 19 supplies a command to the electric motor 18, and the measuring module 20 begins to measure the intensity I of the current of the command. The decision unit 23 continuously observes the change in the intensity I, or of a temporal function that is correlated therewith and that it calculates, at step E3. If it concludes that this function has stabilised (step E4), in particular if the function crosses a given threshold (for example dI/dt<5 A/s), it orders that the electrical command be prolonged only for a given duration $\Delta t$ and that the command should then stop (step E9); otherwise, the program returns to step E3.

This is how the duration of prolongation $\Delta t$ is estimated during steps E5, E6, E7 and E8 taking place between steps E4 and E9, simultaneously or successively for E5, E6 and E7:

the temperature $\theta$ in the brake 7 is measured by means of the temperature sensor 21 (step E5);

the hydraulic pressure P in the brake 7 is measured by means of the hydraulic-pressure sensor 22 (step E6);

and the stabilisation value $I_0$ of the electric current is also measured (step E7).

As already mentioned, the temperature and pressure measurements can be made directly in the brake 7, or in the vicinity thereof, and then optionally be the subject of corrections. In a variant, at E5 the value of the temperature $\theta$ is estimated.

The inventors found that the stabilisation of the electric current of the electric motor 18 in reality arrived a little before the actual release of the pads when the brake 7 was hot, or that a hydraulic pressure was applied to it by the driver pressing on the brake pedal 6. This means that the deflection $I'_1$ has not ended at the instant of stabilisation of the electric current (at the start of the flat portion 26) under these circumstances, and that it is also necessary to apply, in addition to the safety travels $I_2$ and $I_3$, an end-of-clamping travel $\Delta I$, which it is possible to know in advance through prior tests on the brake 7 and measurements of the temperature $\theta$ and of the hydraulic pressure P. In other words, the duration of prolongation $\Delta t$ of the operation of the electric motor 18 after stabilisation of its supply current becomes adaptive or variable in the invention, as well as the corresponding separation travel of the pads of the brake 7, in order to maintain the safety travel $(I_2+I_3)$ after the release of the pads at an invariable value.

The decision model 23 therefore contains functions such as those in FIG. 8, which express the end-of-release travel $\Delta I$ as a function of the hydraulic pressure P and of the temperature $\theta$ (here $L_{100}$, $L_{200}$ and $L_{300}$ for temperatures of 100° C., 200° C. and 300° C. respectively for the brake 7). The hydraulic pressure P is expressed in bar, and the end-of-clamping travel $\Delta I$ in millimetres. These functions are, at equal temperatures, approximately linear ($\Delta I = a\,P + b$, where a and b are fixed coefficients) as soon as moderate braking is applied, and tend toward zero the absence of braking ($\Delta I \approx 0$ for $P \approx 0$).

Finally, the duration of prolongation $\Delta t$ in general depends not only on the end of travel $(\Delta I + I_2 + I_3)$ to be applied, but on the speed of rotation of the electric motor 18 when the stabilisation value $I_0$ has been reached. This speed as a function of the intensity can also be determined by preliminary tests.

The invention therefore provides a shorter duration of the releases (approximately a third less than with the known methods, under ordinary conditions), a saving on equipment and on energy consumed, and also quicker reclampings of the brake by virtue of the shortening of the idle stroke, which is highly appreciated if the parking brake must also serve as auxiliary brake under certain emergency circumstances during driving: this becomes more certain.

NOMENCLATURE

1 Automobile
2 Front wheels
3 Front axle
4 Rear wheels
5 Rear axle
6 Brake pedal
7 Brake
8 Actuator
9 Motor control unit
10 Hydraulic circuit
11 Calliper
12 Housing
13 Hydraulic cavity
14 Piston
15 Screw
16 Nut
17 Screw-nut system
18 Electric motor
19 Command-supply module
21 Temperature sensor
22 Hydraulic-pressure sensor
20 Measuring module
23 Decision module
24 Starting peak 25 Decreasing portion
26 Flat portion
60 Geared motor
61 Flange
62 Flange
I Intensity of the electric current
$I_0$ Electric-current stabilisation value
t Time
dI/dt Derivative of intensity
I1 Imposed brake-release deflection
I1' Useful brake-release deflection
I2 First additional deflection of the actuator
I3 First additional deflection of the actuator
ΔI End-of-travel of release of the pads
θ Temperature
P Hydraulic pressure
Δt Duration of prolongation of current command
E1 Driver command
E2 Supply of command and measurement of intensity
E3 Change of intensity function
E4 Stabilisation
E5 Temperature measurement
E6 Hydraulic-pressure measurement
E7 Measurement of stabilised intensity
E8 Determination of duration of prolongation
E9 Prolongation determined then stoppage of command
$L_{100}$, $L_{200}$, $L_{300}$ Functions of end-of-travel release

The invention claimed is:

1. Motor control unit intended to control an electric motor of an electromechanical actuator of a brake of a vehicle, which comprises:

a module supplying commands of an electric current to the electric motor, including commands to release the brake;

a module for continuous measurement of the intensity of the electric current supplied to the electric motor during the release commands;

a decision module connected to the modules for continuously measuring the intensity of the electric current and for supplying commands, which is designed, during each of the release commands, to evaluate successive values of said intensity of the electric current, to note a stabilisation of said intensity of the electric current, and to stop supplying the electric current after having noted the stabilisation, the control unit comprising a temperature sensor and a hydraulic-pressure sensor continuously making measurements, respectively, of a temperature and of a hydraulic pressure representing a temperature and a hydraulic pressure present in the brake, the decision module is connected to the temperature sensor and to the hydraulic-pressure sensor, and the decision module is arranged to determine a given duration of prolongation of supply of the electric current after the stabilisation has been noted, the given duration being dependent on the measurements of the temperature sensor and of the hydraulic-pressure sensor.

2. Motor control unit according to claim 1, in wherein the given duration also depends on a degree of stabilisation of the intensity of the electric current, obtained during stabilisation.

3. Motor control unit according to claim 1, wherein the given duration is determined for applying an end-of-release travel plus a safety release travel to the brake, the end-of-release travel being obtained by a linear function of the hydraulic pressure, the safety release travel being fixed.

4. Motor control unit according to claim 1, wherein the motor control unit is designed to calculate a temporal drift of said intensity of the electric current.

5. Motor control unit according to claim 4, wherein the function of intensity of the electric current is an absolute value of said temporal drift.

6. Motor control unit according to claim 1, wherein the motor control unit is designed to note the stabilisation by detecting that a given threshold has been crossed, by a function of intensity of the electric current obtained by means of the measuring module.

7. Motor control unit according to claim 6, wherein the function of intensity of the electric current is the intensity of the electric current.

8. Electromechanical parking brake device for a vehicle, comprising said brake, which is associated with a wheel of the vehicle, an actuator of the brake, said electric motor for moving the actuator, and the motor control unit of the electric motor in accordance with claim 1.

9. Motor vehicle, comprising the electromechanical parking brake device according to claim 8.

10. Method for controlling an electromechanical vehicle brake by electric-current commands for clamping and releasing the brake supplied to an electric motor controlling an actuator of the brake, comprising continuous measurements of intensity values of the electric current during the release commands, of a temperature representing a temperature in the brake and of a hydraulic pressure representing a hydraulic pressure in the brake, and an interruption of the release commands after a given duration as soon as a stabilisation of said values is noted, the given duration being dependent on the measurements of the temperature, of the hydraulic pressure and of an electric-current stabilisation value.

* * * * *